US008253096B2

(12) United States Patent
Numata

(10) Patent No.: US 8,253,096 B2
(45) Date of Patent: Aug. 28, 2012

(54) TIME-OF-FLIGHT MASS SPECTROMETER

(75) Inventor: Koji Numata, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 13/149,675

(22) Filed: May 31, 2011

(65) Prior Publication Data

US 2012/0068064 A1 Mar. 22, 2012

(30) Foreign Application Priority Data

Sep. 16, 2010 (JP) ................................. 2010-207669

(51) Int. Cl.
*G01K 13/00* (2006.01)
*G01N 27/82* (2006.01)
*H01J 49/40* (2006.01)

(52) U.S. Cl. ......................... 250/287; 250/281; 250/282

(58) Field of Classification Search .................. 250/281, 250/282, 287
See application file for complete search history.

(56) References Cited

U.S. PATENT DOCUMENTS 7,227,134 B2 * 6/2007 Miller et al. .................. 250/288
7,453,060 B2 * 11/2008 Miller et al. .................. 250/288
7,456,394 B2 * 11/2008 Cameron et al. .............. 250/288
7,579,589 B2 * 8/2009 Miller et al. .................. 250/292
7,902,498 B2 * 3/2011 Miller et al. .................. 250/282
2012/0068064 A1 * 3/2012 Numata ........................ 250/287

FOREIGN PATENT DOCUMENTS

JP 2008-157671 7/2008

* cited by examiner

*Primary Examiner* — David A Vanore
(74) *Attorney, Agent, or Firm* — DLA Piper LLP (US)

(57) ABSTRACT

There is provided a time-of-flight mass spectrometer of a simple configuration and low cost that prevents temperature drift and provides stable mass spectrum without the use of expensive Invar material for the flight tube which nevertheless is not easily affected by external vibrations and does not deflect under its own weight when held as a cantilever. The flight-tube is made of a CFRP pipe 17*a* whose inner and outer surfaces are provided with an electroless nickel-plated layer 17*b* as an electroconductive treatment. Electroconductive adhesive 21 is used for joining to flight-tube holding member 18. Unlike previous flight-tubes made of metal, flight-tubes made of CFRP pipe 17*a* do not deform even when no temperature adjustment and control system is used. Also, since the specific gravity of CFRP is only about one-fifth of that of stainless steel, the flight-tube does not easily deflect even when it is held as a cantilever. Furthermore, since CFRP has good vibration damping property, it is not easily affected by vibrations.

3 Claims, 3 Drawing Sheets

TIME-OF-FLIGHT MASS SPECTROMETER

TECHNICAL FIELD

The present invention relates to a time-of-flight mass spectrometer used to analyze ion specimens generated by an ion source and in particular to a time-of-flight mass spectrometer wherein changes in environmental temperature do not cause errors in the value of the mass-to-charge ratio of the measured ions.

BACKGROUND TECHNOLOGY

With a time-of-flight mass spectrometer, different ions that are accelerated at substantially the same time by an electrical field are introduced into a flight space that is formed in a flight-tube. The time of flight required for the ions to reach an ion detector after traveling through the flight space is used to separate the different ions by mass (to be more accurate, by mass-to-charge ratio, m/z). The ion detector converts the time of flight to mass so that a continuous signal is detected corresponding to the quantity of ions that reach the ion detector. A mass spectrum is then created where the horizontal axis is used as the mass axis, and the vertical axis is used as the signal strength axis. With a time-of-flight mass spectrometer such as this, mechanical expansion and contraction of the flight-tube caused by changes in temperature cause subtle changes in the flight distance of the ions. These subtle changes in the flight distance cause variations in the flight time of ions of the same mass. This then causes a shift in the mass axis of the mass spectrum. If the temperature change (temperature drift) of the flight-tube is large enough, the shift in the mass axis can cause an error in the accuracy of the measured mass to exceed the required specifications for the apparatus. For this reason, with the time-of-flight mass spectrometer described in Patent Literature 1, variations in temperature of the flight-tube 17 are reduced by the use of a system for controlling the temperature of a vacuum chamber 10 wherein the vacuum chamber that houses flight-tube 17 made of stainless steel is disposed within a constant temperature chamber 15 as shown in FIG. 4 and the temperature within the constant temperature chamber 15 is monitored with a temperature sensor 32 to control the temperature of the vacuum chamber 10. However, even if the temperature of the vacuum chamber is controlled, if the ambient temperature (the temperature of the room where the apparatus is installed) changes rapidly, it is difficult for the temperature adjustment and control for the vacuum chamber to keep up with the change in the ambient temperature, causing temperature disturbances that result in the mass axis to shift.

Prior Art Literature

Patent Literature

Patent Literature 1: Laid-Open Patent Application Publication No. 2008-157671

SUMMARY OF THE INVENTION

Problems to be Solved by the Invention

Temperature control systems such as the afore-described have problems such as the complicated system configuration and the inability to get accurate analysis results by controlling the temperature if the change in ambient temperature is too rapid.

FIG. 5 shows another method. Here, an Invar-based alloy with a very low coefficient of linear expansion is used as the material for the flight-tube 17. However, Invar-based alloys are expensive, and using them as the material for the flight-tube 17 results in a high-cost component because of the high price of Invar as compared to steel, the limited diameters in which the materials are commercially available, and the difficulty in welding a flange at either ends of the pipe for holding and securing an ion accelerator/ion detector and a reflectron.

Furthermore, to avoid creating strain in the flight space of the flight-tube 17 under thermal expansion and contraction caused by temperature changes, the reflectron 13 end of the flight-tube 17 is not mechanically constrained in the direction of linear expansion while the ion accelerator 11 located at the other end is secured by a flight-tube holding member 18. Moreover, since the flight-tube 17 is mounted horizontally, flight-tube holding member 18 must hold as a cantilever the total weight of the flight-tube 17 and reflectron 13 connected thereto. If the flight-tube 17 deforms under its own weight, the accuracy of the mass measurements decreases. For that reason, the flight-tube 17 is required to have the rigidity to not bend under its own weight.

If the flight-tube secured by its one end by the flight-tube holding member is used while installed perpendicularly (not illustrated), the flight-tube will not bend under its own weight, but since the center of gravity of the flight-tube is raised and the position of the reflectron becomes higher than the lowest position in the apparatus, the setup is more easily affected by horizontal vibrations of the apparatus. This can become a factor for noise in the analysis or cause problems with the mass axis being shifted.

The present invention was made in light of the afore-described inventions, and it is the object of the present invention to provide a time-of-flight mass spectrometer of low cost and simple configuration that is free of temperature drifts and generates stable mass spectrum without the need for using high-performance constant temperature chamber or expensive Invar-based flight-tube and features a flight-tube that is not affected by vibration or bending under its own weight even when supported as a cantilever.

Means for Solving the Problems

The present invention made to solve the above-described problems is a time-of-flight mass spectrometer that includes: a vacuum vessel for forming a vacuum therein, the vacuum vessel including: a flight tube for forming a flight space through which ions travel; an acceleration electrode for providing an initial acceleration to ions; and a detector for detecting the ions; wherein the flight-tube is made of a carbon fiber reinforced thermosetting plastic whose surface is provided with an electroconductive treatment and the flight-tube is supported as a cantilever by a flight tube holding member.

With the present invention, carbon fiber reinforced thermosetting plastic ("CFRP") is used as the material for the flight-tube. CFRP is widely used in aircrafts for reasons including its high moldability. The CFRP material and the lamination and orientation in the fiber direction result in a coefficient of linear expansion of CFRP to be less than that of metals (less than 1/170 of conventional stainless steel and less than one-fifth of Invar), and the flight-tube does not deform even without the use of any temperature adjustment and control system.

Since a high-voltage of ± several kV is applied to the flight-tube, the flight-tube must be made of an electroconductive material. CFRP is not electroconductive because of a resin layer that is formed on the surface of the CFRP. The surface of the CFRP is treated by electroless plating and the like to make the CFRP electroconductive. By providing an electroconductive treatment to the surface of the CFRP, a flight-tube made of CFRP and having the same functionalities as previous flight-tubes made of metal is provided.

CFRP is strong enough against impact to be used in aircrafts. In terms of mechanical strength related to bending strength, its Young's modulus is approximately 1.4-fold of that of stainless steel. Its specific gravity is approximately one-fifth of that of stainless steel. This means that the flight-tube does not bend under its own weight even when it is held horizontally as a cantilever. Moreover, since CFRP is a composite material, its vibration-damping property is high as compared to metals and damps vibrations well. This means that even when the flight-tube is held perpendicularly as a cantilever, it is not easily affected by external vibrations.

Effects of the Invention

Unlike flight-tubes made of metal, the coefficient of linear expansion of flight-tubes made of CFRP can be reduced to nearly zero. This means that the flight-tube does not deform even when a temperature adjustment and control system is not used. Also, because of their light weight and high Young's modulus, the flight-tubes do not deflect even when they are held horizontally as a cantilever. Furthermore, because of its high vibration-damping property, flight-tubes made of CFRP are not easily affected by external vibrations even when they are held perpendicularly and supported as a cantilever. Still furthermore, because of the high moldability of CFRPs, CFRPs can be formed into pipes of any diameter. Also, because the pipe and the flanges at either ends of the pipe for attaching an ion accelerator/ion detector or a reflectron can be joined using an adhesive, the work process is simplified and the processing cost is reduced as compared to welding which is required when working with metals. Still furthermore, by providing an electroconductive treatment by forming a metal film on the surface of the CFRP by electroless nickel plating and the like, the same functionalities as a metal flight-tube are obtained while providing an out-gas suppression effect in a vacuum environment that uses a vacuum pump of a slow evacuation rate. This means that even though a high voltage is applied to the flight-tube in a vacuum, some prevention of vacuum discharge can be expected. As afore-described, this invention provides a time-of-flight mass spectrometer of low-cost and simple configuration that prevents temperature drifts and generates stable mass spectrum.

EMBODIMENTS OF THE INVENTION

Figure 1:
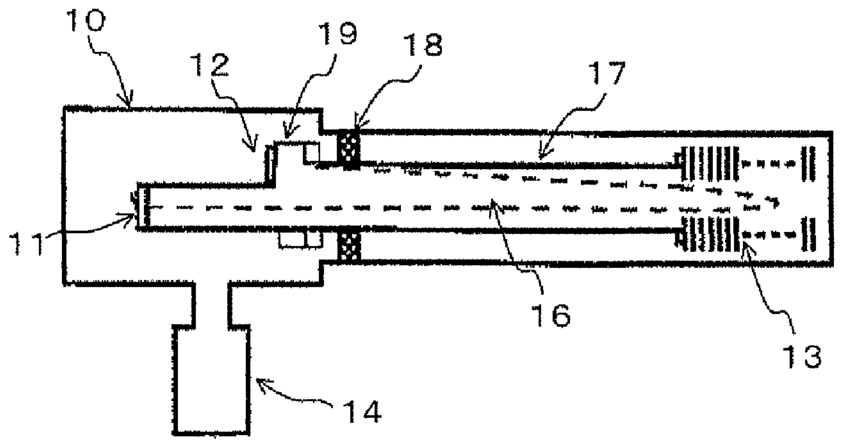
FIG. 1 shows a time-of-flight mass spectrometer according to the present invention.

FIG. 1 shows the major components of a time-of-flight mass spectrometer according to the present invention. This time-of-flight mass spectrometer can be used as a liquid chromatograph/mass spectrometer (LC/MS) by connecting a liquid chromatograph in a previous stage. The operation of the present apparatus is described next. A sample solution containing the target components is ionized by electrospray ionization or some other method. The ions that are generated are introduced to a vacuum chamber 10 which is evacuated to create a vacuum by a vacuum pump 14. The ions are discharged by an ion accelerator 11, fly through an ion flight space 16 that is formed within a flight-tube 17, are turned around by an electrical field that is formed by reflectron 13 that is disposed at one end of the flight-tube 17, fly back through the flight space 16 and arrive at and are detected by a detector 12. It should be noted that even though the present embodiment concerns a turn-around type time-of-flight mass spectrometer disposed with a reflectron 13, the present invention also includes one-way type time-of-flight mass spectrometers wherein an ion accelerator is disposed at one end of a flight-tube and an ion detector at the other end, and also multi-turn type time-of-flight mass spectrometers wherein ions travel through the flight space multiple times by the use of multiple reflectrons. Furthermore, even though with the present embodiment the flight-tube 17 is mounted horizontally, the present invention also includes the configuration where the flight-tube 17 is mounted perpendicularly (not illustrated).

Figure 2:
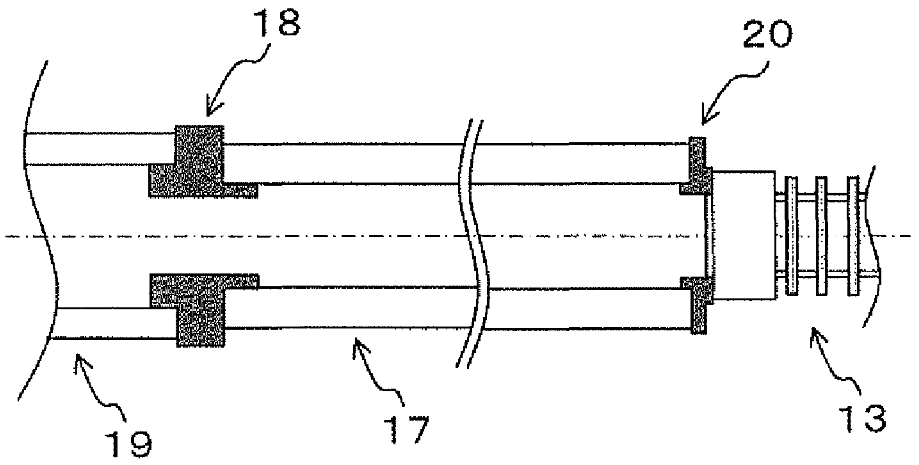
FIG. 2 shows a flight-tube according to the present invention.

FIG. 2 shows the periphery of a flight-tube in a time-of-flight mass spectrometer according to the present embodiment. An ion accelerator/detector holding member 19 and a flight-tube holding member 18 are shown connected. A flight-tube holding member 18 is connected to one end of the flight-tube 17, and a reflectron 13 is connected to the other end via a reflectron holding member 20. The flight-tube holding member 18 supports the total weight of the flight-tube 17, reflectron holding member 20 and reflectron 13 as a cantilever by supporting one end of the flight-tube 17.

The reason for supporting as a cantilever is to avoid distorting the flight space due to thermal expansion or contraction of the flight-tube 17 caused by temperature changes. For this purpose, it is better not to provide any mechanical constraint in the direction of linear expansion at the reflectron 13 end of the flight-tube 17. Instead, the flight-tube holding member 18 at the other end—the ion accelerator 11 end—is used to provide a cantilevered support structure. This means that flight-tube 17 has to have the rigidity to resist deflecting under the weight of approximately 5 kg of the reflectron 13 and the weight of the flight-tube 17 itself which are held as a cantilever.

Figure 3:
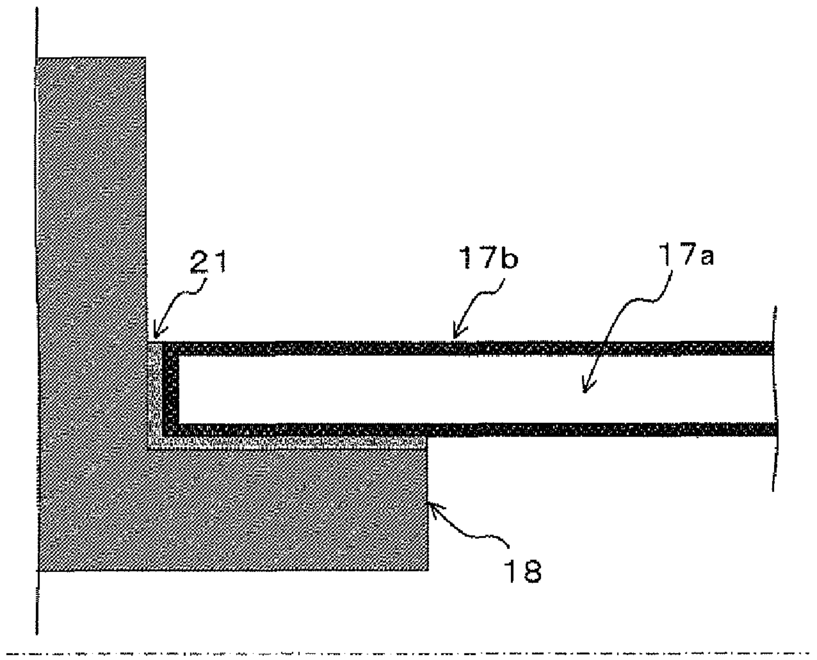
FIG. 3 shows an enlarged view of a flight-tube according to the present invention.
Figure 4:
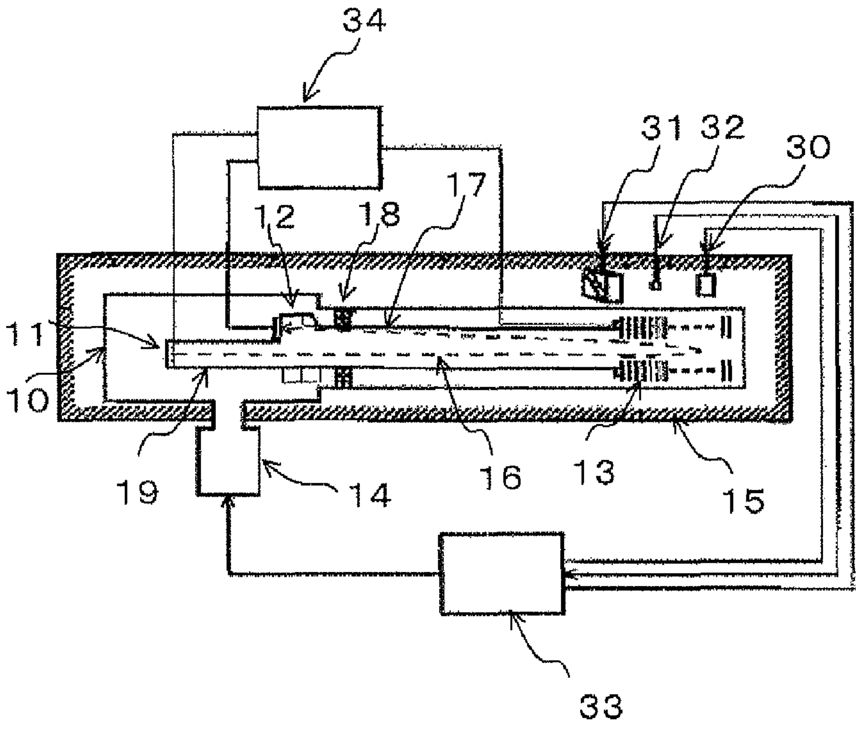
FIG. 4 shows a time-of-flight mass spectrometer that uses a flight-tube that is equipped with a temperature adjustment mechanism.
Figure 5:
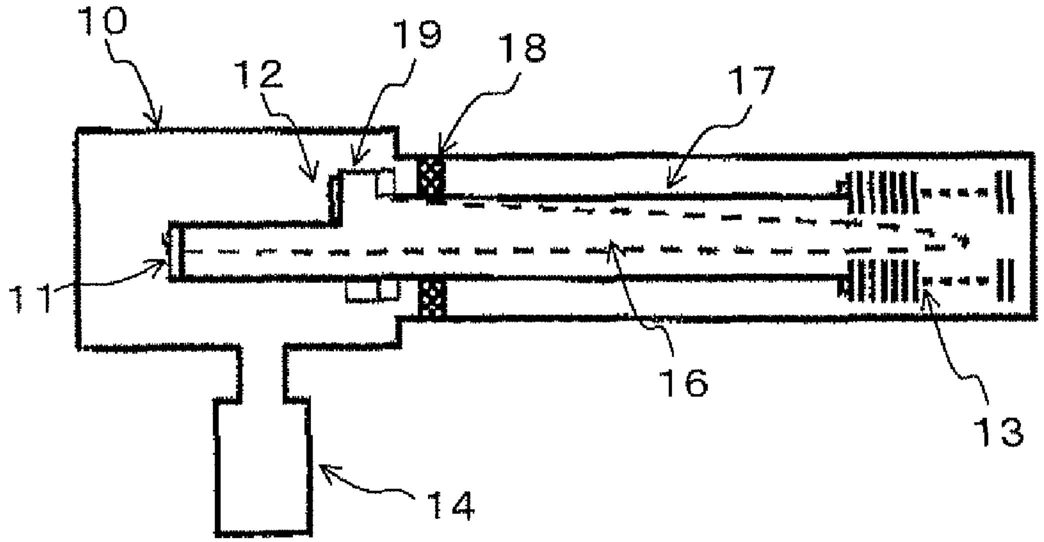
FIG. 5 shows a time-of-flight mass spectrometer that uses a flight-tube made of Invar.

For this reason, as shown in FIG. 3, a CFRP pipe **17*a* that is provided with an electroless nickel plated layer 17*b* as an electroconductive treatment is used as the flight-tube 17. An electroconductive adhesive 21 is used for joining to the flight-tube holding member 18**. The reasons for this are explained below.

Since the ion accelerator 11 and the ion detector 13 are both solidly fixed to the flight-tube, if the distance between the two is used as the flight distance of the ions (time-of-flight duration of the ions), the time-of-flight duration of the ions becomes dependent on the length of the flight-tube 17. For this reason, to minimize the change in length of the flight-tube 17 due to the effects of temperature drift, the flight-tube 17 must be made of a material whose coefficient of linear expansion is very small.

For this reason, Invar—known for its small coefficient of linear expansion and its rigidity against deflection in the longitudinal direction—is often used as the material for the flight-tube 17. However, since Invar is an expensive material, other materials that have similar properties are desirable. For this reason, CFRP—known for its good moldability, its coefficient of linear expansion that is less than metals and its tensile strength and Young's modulus, both measures of mechanical strength related to bending strength, that exceed those of metals—is used as the material for the flight-tube 17.

CFRP is a composite material where carbon fibers are impregnated with a thermosetting resin such as epoxy and thermoset. In general, it is referred to as a dry carbon and its resin content is no more than 40%. CFRP can be generally shaped into the form of a pipe by filament winding or sheet winding. With the filament winding method, continuous carbon reinforced fibers impregnated with epoxy resin and the like are shaped by winding around a rotating metal mandrel (a hollow cylindrical molding die) and are cured in a thermosetting chamber to obtain the finished product. With the sheet winding method, fabric or tape featuring prepreg and carbon fibers arranged in one direction is impregnated with epoxy resin in advance to obtain sheets of half-cured intermediate materials which are wound around a rotating mandrel to shape and thermally cure them to obtain finished products. Pitch-based materials and PAN-based materials with their low coefficient of linear expansion can be used as the CFRP materials either singly or in any combination of the two.

Since a property of carbon fibers is to thermally expand and contract in the fiber direction, by the particular selection of the type, rigidity and the direction of thermal expansion of the pitch-based or PAN-based carbon fibers to be used as the CFRP and by selecting the orientation angle of the fibers, the coefficient of linear expansion of the CFRP can be made to be nearly zero. Such CFRP is used as the material for the flight-tube.

A high voltage of ± several kVs is applied to the flight-tube 17, ion accelerator 11 and reflectron 13 to create a potential difference across flight-tube 17 and ion accelerator 11 and across reflectron 13 and flight-tube 17 so as to accelerate the ions that pass between them. Because a voltage is applied to the flight-tube 17, the flight-tube 17 must be made of an electroconductive material. However, since CFRP is not electroconductive due to a resin layer that is formed on the surface of the CFRP, the CFRP has to be made electroconductive by providing an electroconductive treatment by, for example, an electroless plating of the surface of the CFRP. Providing an electroconductive treatment to the surface of the CFRP allows a flight-tube made of CFRP to have the same functionalities as previous flight-tubes made of metals.

As for the thickness of the film that is deposited on the surface of the CFRP as an electroconductive treated layer, if the film thickness exceeds 100 μm, the coefficient of linear expansion of the electroconductively treated layer becomes too large and affects the low thermal expansion property of the CFRP. It also is a cost increasing factor. On the other hand, if the film thickness is made less than 1 μm, problems arise such as increased electrical resistance and difficulty in keeping the film thickness uniform. For these reasons, a film thickness that is believed desirable for electroless nickel-plating in terms of minimal effect on the low thermal expansion of CFRP and uniformity of film thickness over the entire surface is about 10 μm. Furthermore, since the electrical resistance of an electroconductive treated layer with a film thickness of this amount is about 1Ω, the temperature increase due to heat that is internally generated by the current that flows through the electroconductive treated layer is in the order of magnitude of $\times 10^{-7}$° C. This represents a temperature change that is so small that it can be ignored.

The type of electroconductive treatment that can be used includes electroless plating (any one of either gold, silver, copper, nickel, tin or the like), electroplating (any one of either gold, silver, copper, nickel, trivalent chromium, tin or the like), vapor deposition (any one of either gold, silver, copper, aluminum or the like) and thermal spraying (any one of either aluminum, stainless steel, nickel, zinc or the like). In a vacuum environment where outgassing can be tolerated, epoxy-based electroconductive paint that contains electroconductive fillers may be used as well. Any of the above may be used either singly or in combination.

Since the flight-tube is placed in a vacuum, if the vacuum environment is created using a vacuum pump of a slow exhaust rate, moisture and the like that are adsorbed on the resin layer at the surface of the CRFP can be released as an outgas that degrades the amount of vacuum that is created. If a high voltage is applied to the flight-tube, the lowered degree of vacuum can become a factor that causes a vacuum discharge. When an electroconductive treatment is provided to the surface of the CFRP pipe by, for example, an electroless plating of a metal such as nickel, the coated metal film suppresses the adsorbed gas and is effective in reducing the outgassing.

In addition to the afore-described electroconductive treatment, a CFRP surface with uniform electroconductivity can be obtained by removing some of the resin layer from the CFRP pipe surface mechanically (by polishing, machining with a lathe, etc.) or chemically (chemical wet etching, etc.) and exposing the carbon fibers. However, a requirement for using this method is that the carbon fibers on the inner surface of the pipe—which will become exposed by the removal of the entire resin layer—be laid uniformly with no unevenness.

Another material other than CFRP that is known for its coefficient of linear expansion that is as low as that of Invar is quartz. However, because Young's modulus of quartz is less than one-half of that of stainless steel, supporting the flight-tube horizontally as a cantilever and yet not deflecting under the weight of the reflectron and the weight of the flight-tube itself require the wall thickness of the pipe section of the flight-tube to be more than double of that of a stainless steel flight-tube. Furthermore, since quartz is an insulator, using quartz as a flight-tube requires that the surface of the quartz pipe be provided an electroconductive treatment just like a CFRP pipe and that a metal flange be electroconductively joined at either ends of the pipe. Furthermore, since quartz is extremely brittle, care is required to not damage them due to impact and the like.

In contrast to this, CFRPs are so strong against impact that they are used in aircrafts. Furthermore, as for bending rigidity, since the Young's modulus of CFRP is approximately 1.4-fold of that of stainless steel, the wall thickness of the pipe portion can be about 20% thinner than that made of stainless steel. Also, since the specific gravity is about one-fifth of that of stainless steel, when this is combined with the ability to reduce the wall thickness, a weight reduction of about 20% is possible. This means that the flight-tube does not deflect under its own weight when the flight-tube is held horizontally as a cantilever.

Furthermore, since CFRP is a composite material, its vibration-damping property is high and damps vibration well as compared to metals. Even when the flight-tube is mounted perpendicularly and held as a cantilever by the flight-tube holding member, it is not easily affected by vibration, and factors that cause analysis noise and shift in the mass axis is suppressed.

An electroconductive adhesive 21 is used to join the flight-tube 17 and the flight-tube holding member 18. Curing is performed in an oven that is set to a temperature of about 100° C. Other than stainless steel, the flange portions may be made of aluminum, Invar or the like, or may be molded using CFRP.

An epoxy adhesive containing electroconductive filler of high electroconductivity and adhesion strength is used as the electroconductive adhesive 21. Examples of electroconductive fillers that are included in electroconductive paint and electroconductive adhesive include silver, copper, brass, iron, zinc, aluminum, nickel, stainless steel, carbon or the like, either singly or in combination, either as powder, fiber, particles, flakes or the like, of a size and shape appropriate for inclusion in an electroconductive adhesive. In addition to joining the flange portion and the pipe portion using an adhesive as described above, a method called RTM (resin transfer molding) can be used so that resin is poured onto a carbon fiber that is in a RTM mold and thermoset to create a piece featuring the flange portion and the pipe portion that are formed as a single piece from CFRP whose surface is then provided with an electroconductive treatment.

Description of the Numerical References

10. Vacuum chamber
11. Ion accelerator
12. Ion detector
13. Reflectron (ion reflector)
14. Vacuum pump
15. Constant temperature chamber
16. Ion flight space
17. Flight-tube
17*a*. CFRP pipe
17*b*. Electroless nickel plated layer
18. Flight-tube holding member
19. Ion accelerator/detector holding member
20. Reflectron holding member
21. Electroconductive adhesive
30. Heater
31. Fan
32. Temperature sensor
33. Operation and control unit
34. Temperature control unit

What is claimed is:

1. A time-of-flight mass spectrometer comprising:
a vacuum vessel for forming a vacuum therein, said vacuum vessel comprising:
a flight tube that forms a flight space through which ions travel;
an acceleration electrode for providing an initial acceleration to the ions; and
a detector for detecting the ions;
wherein said flight-tube is made of a carbon fiber reinforced thermosetting plastic whose surface is provided with an electroconductive treatment and said flight-tube is supported as a cantilever by a flight tube holding member.

2. The time-of-flight mass spectrometer according to claim 1 wherein said flight-tube is mounted horizontally or perpendicularly.

3. The time-of-flight mass spectrometer according to claim 1 or 2 wherein the coefficient of linear expansion of said carbon fiber reinforced thermosetting plastic is nearly zero.

* * * * *